United States Patent [19]

Kuzee et al.

[11] Patent Number: 5,558,899
[45] Date of Patent: Sep. 24, 1996

[54] METHOD FOR THE PREPARATION OF POLYSACCHARIDE DERIVATIVES

[75] Inventors: Hendrika C. Kuzee, Oost Souburg; Theodorus L. Hoeks, Bergen Op Zoom; Paulus J. Visschedijk, Roosendaal, all of Netherlands

[73] Assignee: Cooperatie Suikerunie U.A., Roosendaal, Netherlands

[21] Appl. No.: 365,224

[22] Filed: Dec. 28, 1994

[30] Foreign Application Priority Data

Jan. 10, 1994 [NL] Netherlands ............................ 9400040

[51] Int. Cl.$^6$ .................................................... A23L 1/025
[52] U.S. Cl. ........................ 426/658; 426/237; 426/241; 426/242; 426/247; 426/804; 536/18.6; 536/126
[58] Field of Search ............................ 536/18.5, 18.6, 536/126; 426/658, 237, 241, 247, 804, 242

[56] References Cited

U.S. PATENT DOCUMENTS

| | | | |
|---|---|---|---|
| 2,719,179 | 9/1955 | Mora et al. | 536/623 |
| 3,432,413 | 3/1969 | Vanderhoff | 204/159.22 |
| 3,876,794 | 4/1975 | Rennhard | 426/548 |
| 4,654,039 | 3/1987 | Brandt et al. | 604/368 |
| 4,683,297 | 7/1987 | Yanami et al. | 536/18.6 |
| 4,766,207 | 8/1988 | Deger et al. | 536/18.6 |
| 4,943,630 | 7/1990 | Jacquinet et al. | 536/123 |
| 4,996,306 | 2/1991 | McDaniel et al. | 536/18.6 |
| 5,350,686 | 9/1994 | Jhingan | 435/173.2 |
| 5,364,794 | 11/1994 | Ezure et al. | 536/18.6 |

FOREIGN PATENT DOCUMENTS

| | | |
|---|---|---|
| 214986 | 10/1984 | Germany . |
| 1425624 | 2/1976 | United Kingdom . |

OTHER PUBLICATIONS

Chen, Shui–Tein et al., "Preparative Scale Organic Synthesis using a Kitchen Microwave Oven", *J. Chem. Soc., Chem. Commun.*, 1990, pp. 807–809.

*Primary Examiner*—Esther M. Kepplinger
*Assistant Examiner*—Lien Tran
*Attorney, Agent, or Firm*—Young & Thompson

[57] ABSTRACT

A method for the preparation of polysaccharide derivatives comprises reacting at least a saccharide, such as glucose, maltose or glucose syrup, a "food grade" polycarboxylic acid, such as citric acid, or inorganic acid, such as phosphoric acid, which also acts as catalyst, and optionally a polyol, such as serbitol, under the influence of electromagnetic waves to give a reaction product at a temperature of 140°–300 °C. Preferably, the envisaged reaction is carried out in a commercially available microwave oven having a wave frequency in the range of 900–2500 MHz. The products obtained can be incorporated as low-calorie "bulking agents" in diet foods, such as dessert, cake and the like.

10 Claims, No Drawings

METHOD FOR THE PREPARATION OF POLYSACCHARIDE DERIVATIVES

BACKGROUND OF THE INVENTION

1. Field of the Invention

The invention relates to a method for the preparation of polysaccharide derivatives by reacting at least a saccharide, an acid, which also acts as catalyst, and optionally a polyol at elevated temperature.

2. Description of the Related Art

A method of this type is disclosed in U.S. Pat. No. 3,766,165. More particularly, in said American patent a method is described for the preparation of polysaccharide derivatives, in which method d-glucose or maltose, as saccharide, is reacted in the molten state at a temperature of 140°–295° C. and under highly reduced pressure in the presence of a catalytic amount of at most 10 mol % of a "food grade" polycarboxylic acid, for example citric acid, in the absence of water, with the proviso that the water produced during melting and polymerisation is removed immediately. A polyol such as sorbitol can also be used in the abovementioned reaction.

European Patent 404,227 describes a method which can be carried out continuously, with which method the desired polysaccharide product can be obtained both within a short time and without the use of vacuum or the apparatus required to maintain vacuum conditions. To this end the reactants, in the form of a mixture of at least a saccharide, a polyol and a "food grade" polycarboxylic acid are fed through a worm shaft reactor or extruder operating at elevated temperature and under elevated pressure, a reaction product at a temperature of 140°–300° C. being obtained.

Both the method according to U.S. Pat. No. 3,766,165 and the method according to European Patent 404,227 require the use of a dry pulverulent reaction mixture as starting material. In European Patent 404,227 it is also stated that the starting material used in the form of a powder usually has a particle size of less than 3 mm and preferably of 0.05–1 mm.

SUMMARY OF THE INVENTION

The Applicant has therefore made efforts to develop a method which has a short reaction time and which can be carried out continuously, with which method the use of starting materials containing water of crystallisation, or starting materials dissolved in water, does not constitute an inhibiting factor for the production of the desired polysaccharide derivatives to be prepared. The use of a process which is not critical with regard to the moisture content of the starting materials is very attractive from an economic standpoint because of the reduction of starting material costs as a result of the avoidance of costs for working up the starting materials for the abovementioned methods, such as comminution, drying etc.

Surprisingly, it has been found that the abovementioned aim can be achieved if the reactants, in the form of a water-containing mixture of at least a saccharide, a "food grade" polycarboxylic acid or inorganic acid and, optionally, a polyol are heated by means of electromagnetic waves, a reaction product at a temperature of 140°–300° C. being obtained.

The reaction time required for the reaction according to the invention as indicated above varies from 0.5–20 minutes, advantageously 1–7 minutes. In fact, the reaction time is determined by the amount of energy supplied per kg of reaction mixture.

In terms of properties, the product obtained by the method according to the invention in principle corresponds to the product obtained in accordance with the method according to U.S. Pat. No. 3,766,165 and European Patent 404,277, or the product described in U.S. Pat. No. 3,876,794, in particular with respect to reducing power, pH of a solution of the product in water, acid number, residual content of saccharide, of polyol and of polycarboxylic acid, formed levoglucosan and hydroxymethylfurfural (HMF), non-dialysable fraction, optical rotation and Gardner colour; the abovementioned patents are incorporated herein as reference.

Using the method according to the invention it is possible, for example, to heat s water-containing mixture of glucose, sorbitol and citric acid within a period of a few minutes by means of o electromagnetic waves to a temperature of about 200° C. with the formation of a product which has the following characteristics:

glucosecontent$\leq$6 wt. %, advantageously$\leq$4 wt. % sorbitolcontent$\leq$2.5 wt. %, advantageously$\leq$2 wt. % citric acidcontent$\leq$0–75 wt. %, advantageously$\leq$0–5 wt. % levoglucosancontent$\leq$4 wt. %, advantageously$\leq$2.5 wt. % solubility in water about 100 wt. % or less, depending on the amount of polycarboxylic acid used pH of a 10 % solution in water: about 3

Gardner colour: $\leq$10, advantageously$\leq$5, in particular$\leq$3.

Suitable saccharides are advantageously glucose, maltose or maltotriose, glucose syrups and preferably glucose. Glucose can be used for this method in the form of the anhydrate or the monohydrate.

The polyol to be used in the method according to the invention must be a product acceptable in the foodstuffs industry or a "food grade" product, such as, for example, glycerol, erythritol, xylitol, mannitol, galacticol and preferably sorbitol. The amount of polyol is, for example, 0–20 wt. %, advantageously 8–12 wt. %, based on the total amount of solids.

The catalyst used is a polycarboxylic acid acceptable in the foodstuffs industry, or a "food grade" polycarboxylic acid, such as malic acid, fumaric acid, tartaric acid, the terephthalic acids, succinic acid, adipic acid, itaconic acid, or the anhydrides of the latter three acids, and preferably citric acid. Inorganic acids, such as phosphoric acid and hydrochloric acid are also suitable as catalysts. Said inorganic acids do not yield "cross-linking", as a result of which the preparation of polydextrose insoluble in water is not possible using these catalysts. Depending on the amount of polycarboxylic acid used as catalyst, a product is obtained which is insoluble, completely soluble or only partially soluble in water. Roughly it can stated that for the preparation of a water-soluble product an amount of at least 0.1, for example 0.25–2.5 wt. % polycarboxylic acid, and for the preparation of a product which is partially soluble or insoluble in water a larger amount of, for example, at most about 10 wt. % polycarboxylic acid, based on the total amount of solids, can be used.

According to the method in accordance with the invention, therefore, reaction mixtures of:

70–99.9 wt. %, advantageously 85.5–91.75 wt. % saccharide, preferably d-glucose 0.1–10 wt. %, advantageously 0.25–2.5 wt. % polycarboxylic acid, preferably citric acid and 0–20 wt. %, advantageously 8–12 wt. % polyol, preferably sorbitol are advantageously used.

If necessary, water is then added to these reaction mixtures, which are dry or contain water of crystallisation, so that the water content of the final starting material has a value of, usually, 0.1–90 wt. %, advantageously 5–50 wt. %, based on the total starting material.

The method according to the invention can be carried out with the aid of electromagnetic energy sources generally known from the prior art. Commercially available microwave ovens are used in the examples; however, other known electromagnetic energy sources can also be used.

In the method according to the invention, the electromagnetic energy employed from the sources used is converted into kinetic energy, which results in a rapid rise in the temperature of the reaction mixture. The envisaged condensation reaction proceeds better in the presence of water, which is highly surprising in view of the fact that, according to the prior art, such as U.S. Pat. No. 3,766,165, the water content had to be restricted to an absolute minimum during the envisaged reaction. Within a relatively short reaction time of, for example, 0.5–20 minutes, advantageously 2–7 minutes, an end product can be obtained which has characteristics which are equivalent to the characteristics of the products which are obtained in accordance with the methods according to the above-mentioned literature, i.e. U.S. Pat. Nos. 3,766,165 and 3,876,794 and European Patent 404,277.

The reaction mixture is put inside the electromagnetic wave oven and exposed to electromagnetic radiation to allow the condensation reaction to proceed. The reaction may be carried out batchwise by introducing the reaction mixture in reaction vessels. The reaction may also be carried out continuously by feeding the reaction mixture as a layer or in small containers on a conveyor belt through the electromagnetic wave oven. The reaction mixture can be transported through the electromagnetic wave oven at a speed such that a residence time of 0.5–20 minutes, advantageously 2–7 minutes, is obtained.

The frequency range of the electromagnetic waves for the preparation of polysaccharide derivatives can vary from 3000 kHz to 300 GHz. The frequencies most used industrially are in the radio wave range of about 10–50 MHz and in the microwave range of about 900–3000 MHz. All of the industrial frequency ranges indicated here are suitable for the preparation of polysaccharide derivatives according to the invention.

The power of the electromagnetic energy sources can vary between 0.60 and 100 kW. In fact, the reaction time is determined by the amount of energy per kg reaction mixture. The ratio of power to the amount of reaction mixture which can be converted into polysaccharide derivative per unit time is usually 0.1–6 kW/(kg/hour), advantageously 0.2–1 kW/(kg/hour).

Advantages of the present method compared with the methods disclosed in U.S. Pat. No. 3,766,165 and European Patent 404,227 are, inter alia, that the method according to the invention:

preferably proceeds in the presence of water, so that it is not necessary to use a starting material which both has to be dry and has to have a particle size of less than 3 mm;

can be carried out using non-viscous or viscous solutions of starting materials (syrups), as a result of which an appreciable saving in costs in respect of starting materials can be achieved;

is very "simple" to carry out from the technological standpoint, since neither vacuum nor high pressure has to be employed;

can be carried out continuously;

requires only a very short reaction time; and with the method according to the invention undesired side reactions are more easily controllable, which, for example, is reflected in a lower Gardner colour.

The products obtained in accordance with the method according to the invention can be added, in the non-neutralised or neutralised form, as low-calorie "bulking agents" to diet foods and the like in order to impart to said foods desired characteristics such as texture and the like, which usually are obtained from high-calorie products such as sugar and/or fat. Examples of such foods ape desserts, cakes, biscuits, chewing gum, sweets, dressings, salads, ice cream mixtures and hard and soft candy.

DETAILED DESCRIPTION OF THE PREFERRED EMBODIMENT

The invention is explained in more detail with the aid of the following examples; however, these examples must not be regarded as implying any restriction.

EXAMPLE I

A mixture of 81.56 wt. % glucose monohydrate, 8.3 wt. % sorbitol, 0.64 wt. % citric acid monohydrate and 9.5 wt. % water was mixed homogeneously. 25 g of this mixture was transferred to a 600 ml glass beaker. This glass beaker was then placed in a Philips Cooktronic M716 microwave oven which had a frequency of 2450 MHz and s maximum power of 700 W. After heating for 3 minutes at the maximum setting, a pale yellow product at a temperature of 199° C. was obtained. This product had s Gardner colour of 2.5 (10 wt. % solution in water) and the following composition:

Glucose: 1.75 wt. %;

Sorbibol: 1.35 wt. %;

Citric acid: 0.25 wt. %;

Levoglucosan: 2.00 wt. %; and polydextrose making up the remainder.

The pH of a 15 % solution was 2.85. The viscosity of a 70 % w/w solution in water was 2355 cps. The product obtained was completely soluble in water.

EXAMPLE II (comparison example)

A mixture of 89.15 wt. % glucose anhydrate, 10 wt. % sorbitol and 0.85 wt. % citric acid monohydrate was mixed homogeneously. 25 g of this pulverulent mixture was transferred to a 600 ml glass beaker. This glass beaker was then placed in a Philips Cooktronic M716 microwave oven which had a frequency of 2450 MHz and a maximum power of 700 W. After heating for 8 minutes at the maximum setting, only a fraction of the material had reacted. The reacted yellow product, which had a Gardner colour of 4.5 (10 wt. % solution in water), had the following composition:

Glucose: 2.40 wt. %;

Sorbitol: 1.35 wt. %;

Citric acid: 0.35 wt. %;

Levoglucosan: 2.25 wt. %; and polydextrose making up the remainder.

The temperature of the reacted material was 195° C. The rest of the reaction mixture had not reacted and the temperature of this fraction of the material was 30° C. As a result the total reaction product had a Gardner colour of 2 (10 wt. % solution) and the following composition:

Glucose: 46.0 wt. %;

Sorbitol: 5.7 wt. %;

Citric acid: 0.65 wt. %;

Levoglucosan: 1.10 wt. %; and polydextrose making up the remainder.

The product obtained was completely soluble in water.

EXAMPLE III

After homogenising 70.82 g glucose anhydrate, 7.87 g sorbitol, 5.57 ml $H_3PO_4$ (0.148M) and 15.74 g water, the mixture was transferred to a 1000 ml glass beaker. This glass beaker was placed in a Philips Cooktronic M716 microwave oven which had a frequency of 2450 MHz and a maximum power of 700 W. After heating for 4 minutes at the maximum setting, the product temperature was 203° C. and the product, which was completely soluble in water, had the following composition:

Glucose: 3.15 wt. %;

Sorbitol: 1.40 wt. %;

Levoglucosan: 1.60 wt. %; and polyglucose making up the remainder.

The pH of a 15 % solution in water was 2.91.

EXAMPLE IV

A mixture of 90 wt. % glucose anhydrate, 1.0 wt. % citric acid and 9 wt. % water was homogenised. 50.0 g of this mixture was transferred to a microwave oven which had a frequency of 915 MHz and a maximum power of 650 W. After heating for 5 minutes at the maximum setting, a dark yellow product at a temperature of 204° C. was obtained, which had a Gardner colour of 4 (10 wt. % solution in water) and the following composition:

Glucose: 2.05 wt. %;

Citric acid: 0.45 wt. %;

Levoglucosan: 1.80 wt. %;

HMF: 580 ppm; and polyglucose making up the remainder.

The viscosity of a 70 % w/w solution in water was 2800 cps. The product obtained was completely soluble in water.

EXAMPLE V 0.6 g citric acid and 6.6 g sorbitol were added to 100.0 g glucose syrup which had a DP (degree of polymerisation) of 4 and a solids content of 75 wt. %. 50.0 E of this mixture was placed in a microwave oven which had a frequency of 2540 MHz and a maximum power of 700 W. After heating for 3.5 minutes at the maximum setting, a pale yellow product at a temperature of 200° C. was obtained, which at 420 nm had an absorption of 0.213 (10 wt. % solution in water) and had the following composition:

Glucose: 1.95 wt. %;

Sorbitol: 1.55 wt. %;

Citric acid: 0.30 wt. %;

Levoglucosan: 1.50 wt. %;

HMF: 375 ppm; and polydextrose making up the remainder.

The product obtained was completely soluble in water.

EXAMPLE VI 30.0 g of a solution which contained 8.92 wt. % glucose, 1.00 wt. % sorbitol, 0.08 wt. % citric acid and 90.00 wt. % water was transferred to a 400 ml glass beaker. This beaker was then placed in a microwave oven which had a frequency of 2450 MHz and a maximum power of 700 W. After heating for 9 minutes at the maximum setting, a yellow product at a temperature of 205° C. was obtained, which had the following composition:

Glucose: 6.05 wt. %;

Sorbitol: 2.00 wt. %;

Citric acid: 0.35 wt. %;

Levoglucosan: 2.15 wt. %; and polydextrose making up the remainder.

The product obtained was completely soluble in water.

We claim:

1. Method for the preparation of polysaccharide derivatives comprising reacting at least a saccharide, an acid, which also acts as catalyst, and optionally a polyol at elevated temperature and ambient pressure, wherein the reactants, in the form of a 0.1–90 wt. % water-containing mixture comprising:

70–99.9 wt. % saccharide 0.1–10 wt. % polycarboxylic acid or inorganic acid

0–20 wt. % polyol calculated as a dry solids mixture, are heated under the influence of electromagnetic waves, a reaction product at a temperature of 140°–300° C. being obtained.

2. Method according to claim 1, characterised in that the electromagnetic waves have a frequency in the range from 3000 kHz to 300 GHz.

3. Method according to claim 1, characterised in that the electromagnetic waves have a frequency in the radio wave range of about 10–50 MHz.

4. Method according to claim 1, characterised in that the electromagnetic waves have a frequency in the microwave wave range of about 900–3000 MHz.

5. Method according to claim 1, characterised in that the reactants used are a dry solids mixture of:

85.5–91.75 wt. % saccharide 0.25–2.5 wt. % polycarboxylic acid

8–12 wt. % polyol.

6. Method according to claim 1, characterised in that the reaction mixture contains 5–50 wt. % water.

7. Method according to claim 1, characterised in that the saccharide used is d-glucose, glucose syrups, maltose or maltotriose, the polycarboxylic acid used is citric acid and the polyol used is sorbitol.

8. Method according to claim 1, characterised in that the water-containing reaction mixture is heated under the influence of electromagnetic waves using a ratio of power to the amount of reaction mixture which can be converted to polysaccharide derivative per unit time of 0.1–6 kW/(kg/hour).

9. Method according to claim 8, characterised in that the water-containing reaction mixture is heated under the influence of electromagnetic waves using a ratio of power to the amount of reaction mixture which can be converted to polysaccharide derivative per unit time of 0.2–1 kW/(kg/hour).

10. Method according to claim 1, characterised in that the method is carried out continuously.

\* \* \* \* \*